April 18, 1961 J. H. WEIMER Re. 24,967

TOY CAP REVOLVER WITH EJECTOR

Original Filed Nov. 5, 1956 2 Sheets-Sheet 1

INVENTOR

JOHN H. WEIMER

BY

ATTORNEY

TOY CAP REVOLVER WITH EJECTOR

Original Filed Nov. 5, 1956 2 Sheets-Sheet 2

INVENTOR

JOHN H. WEIMER

BY

ATTORNEY

United States Patent Office

Re. 24,967
Reissued Apr. 18, 1961

24,967

TOY CAP REVOLVER WITH EJECTOR

John H. Weimer, Manheim, Pa., assignor to The Hubley Manufacturing Company, Lancaster, Pa., a corporation of Pennsylvania Original No. 2,855,715, dated Oct. 14, 1958, Ser. No. 620,373, Nov. 5, 1956. Application for reissue Oct. 2, 1959, Ser. No. 844,151

5 Claims. (Cl. 42—58)

Matter enclosed in heavy brackets [ ] appears in the original patent but forms no part of this reissue specification; matter printed in italics indicates the additions made by reissue.

This invention relates to an improvement in toy firearms, more particularly to a toy revolver of the type using toy shells in the cylinder.

While toys of this type have previously been made, nevertheless, they have not realistically simulated the standard counterpart, and generally do not provide adequately simple and safe means for either ejecting or reloading the simulated shells in the rotating cylinder or drum.

The present invention includes in its organization, a drum unit having a chambered cylinder housing a mating ejector each made in one piece and slidably interfitting in spring tensioned relation, the cylinder being rotatably supported in axially fixed relation to the barrel portion of the firearm frame while the ejector is moved automatically to shell ejecting and cap scavenging portion by the pivotal movement of the barrel relative to a cam supported in the handle or stock. After the completion of the ejecting and scavenging stroke, a spring pressed sliding detent is engaged by a portion of the barrel near the limit of the movement of the barrel relative to the stock to permit the ejector to snap back to reloading position.

One of the objects of the invention is, therefore, to provide a novel drum unit including a cylinder and a complementary ejector axially movable therein having as many tubular anvil or cap detonating elements as there are chambers in the cylinder, and which will not only eject the simulated shells but also harmlessly scavenge debris before fresh caps are reloaded.

Another object is to provide each individual anvil whose impact face or cap seat is provided with an opening leading to a firing compartment whereby the gases of detonation are safely trapped while only a portion of the spent smoke may escape about the cylinder to add realism to firing.

A further object is to render the scavenging stroke of the ejector complete in relation to each chamber and to also fully retract the ejector when the barrel is broken to full open position to facilitate reloading of caps and simulated bullets.

A still further object is to provide positive means on the barrel for tripping the spring pressed detent, which controls the cam on the scavenging stroke of the ejector, at the end of each stroke, thereby to permit the ejector as a whole to move back to reloading position under the force of the spring confined between the cylinder and the ejector.

With the above and other objects in view which will more readily appear as the nature of the invention is better understood, the same consists in the novel construction and arrangement of parts hereinbefore more fully described and claimed in the accompanying drawings, in which:

Similar reference numerals designate corresponding parts throughout the several views of the drawings.

Figure 1:
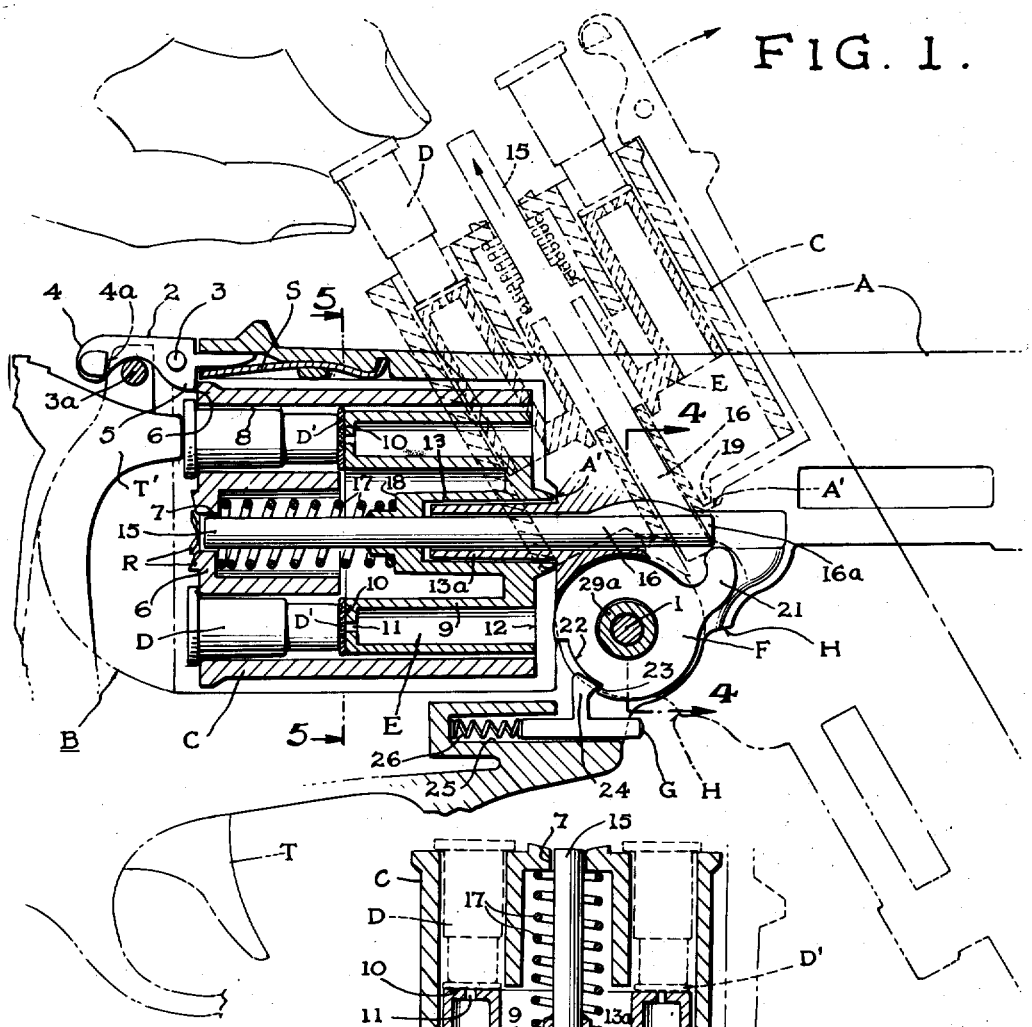
Fig. 1 is an enlarged view of the drum unit, partially in vertical section, showing, in full lines, the position of the cylinder and the ejector with simulated shells and caps in firing position, the dotted line position being the relative disposition of parts just prior to the final shell removing and cap scavenging stroke of the ejector.

Referring to Fig. 1 of the drawings, the revolver comprises a barrel portion designated generally as A, a stock portion B, and a drum unit having a rotatable cylinder C for holding dummy or simulated shells D and masking or housing an ejector E.

As will later more fully appear in detail, the relative movement between the cylinder C and ejector E is controlled by a cam F and a spring urged detent G moved by abutment H on the barrel portion of the gun, to release the detent from the cam.

The cylinder is rotated by means of a trigger mechanism T operating a ratchet arrangement R such as that generally shown, for example, in the Brubaker Patent No. 2,088,891 dated August 3, 1937.

The stock portion of the simulated firearm is also provided with a hammer T′ for striking the simulated shells D to detonate a cap held between the inner end of the simulated shell and the cap seats of anvil elements of the ejector E. The trigger, the hammer, and the means for rotating the cylinder C are conventional and will not be described in detail herein.

The barrel A is, as usual, made in two mating half sections held together by rivets or the like and is connected to the stock B by the pivot pin 1 so that it may be tilted with reference to the stock for reloading.

The barrel portion A is held or secured in position relative to the stock B by a spring latch 2 pivoted at 3 and having a recess for clearing the stock section fastening bolt or rivet $3^a$ while the keeper lugs 4 engage surfaces $4^a$ to hold the barrel normally locked to the stock. Although only one of such lugs is shown in the drawings, it will be understood that there are two and that they extend in opposite directions. In order that the barrel and stock may be placed in the position shown in dotted lines in Fig. 1, latch 2 must be lifted by the user's fingers gripping lugs 4 and raising the latch against the tension of the relatively stiff spring S on pivot 3 to cause lugs 4 to clear the keeper surfaces $4^a$.

Also, the latch 2 has an additional function, namely, that of holding the cylinder C and ejector E of the drum in registering telescoped relation so that the cylinder normally masks the ejector, as will be apparent from Fig. 1. This telescoped relation of the cylinder and the ejector is effected and maintained because the front end of the ejector body abuts face A′ of the barrel portion and the depending shoulder 5, on the underside of the latch 2, engages the rim of the rear end wall 6 of the body of the cylinder.

The medial portion of the rear end wall 6 has an axial opening 7, and in addition, the end wall is provided with a planetary arrangement of openings leading to chamber 8 for receiving the simulated shells D. These shells are solid and flat at their inner ends. Said flat inner ends are intended to cooperate with anvil elements 9, whose cap seating face 10 normally defines the forward limit of chambers 8. That is to say, the ejector E includes a body disposed within the cylinder and formed with a plurality of spaced hollow elongated tubular anvil elements 9, annularly arranged to register with and slidably move in the chambers 8. The cap seating faces 10 of the anvil elements are each provided with an opening 11 leading to the interior compartment which has a gas and smoke escapement opening 12.

Figure 5:
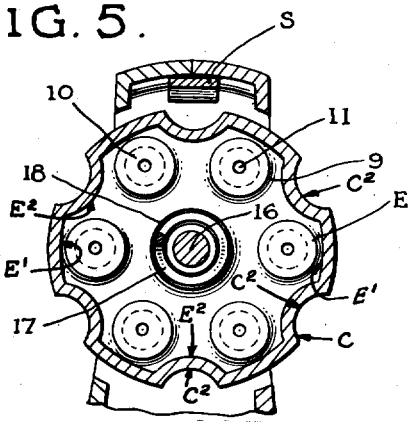
Fig. 5 is a cross sectional view taken on the line 5—5 of Fig. 1.

As will be clearly seen from Figure 5, the cylinder C is provided with a plurality of longitudinal internal ribs $C^2$, and the side wall E′ of the ejector is provided with a plurality of grooves $E^2$ which slidably receive said ribs to permit the body of the ejector E to slide within its masking cylinder and yet be interlocked against angular movement so that both the cylinder C and ejector E will turn or rotate together.

The internal medial portion of the ejector body is provided with a socket 13 having an open forward end and a rear end wall in which the axial shaft 14 is fixed. This shaft has a rear end portion 15 adapted to slide through the central opening 7 (Figs. 1, 2 and 3) and the front end 16 is journalled in the sleeve $13^a$ on the rear face A′ of the barrel and which sleeve forms the side wall of the socket.

The forward portion $16^a$ of the shaft normally projects beyond the telescoped registering cylinder and ejector into a clearance space in the barrel portion A forwardly of the face A′ and which barrel portion also houses the cam F. The spring 17 surrounds the rear portion 15 of the shaft 14 and is confined between the inner side of the rear cylinder wall 6 and a shoulder 18 on the inner end of the socket 13.

The spring 17, therefore, normally tends to urge the ejector and cylinder apart so that the rear wall 6 is held firmly against the shoulder 5 of the latch 2, and the collar 19 of the ejector body is held in engagement with the face A′ of the barrel portion A.

Figure 2:
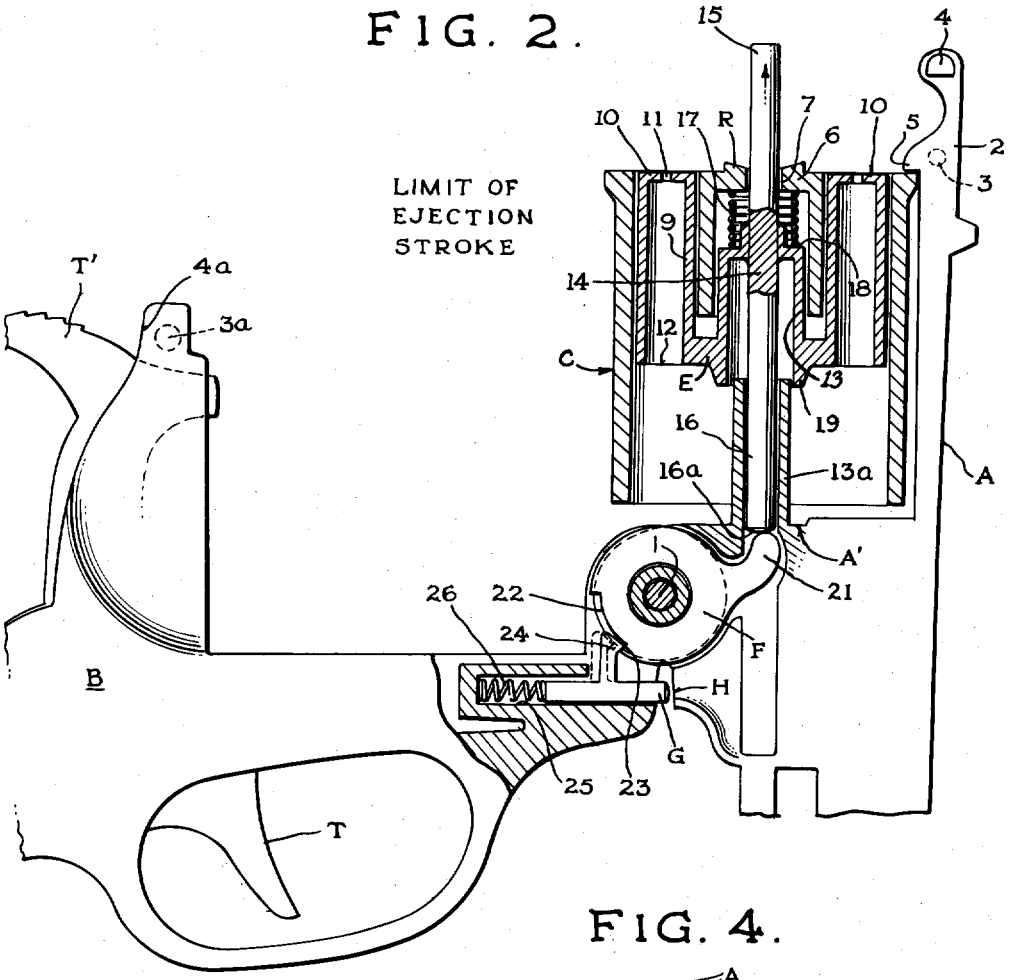
Fig. 2 is a diagrammatic sectional view illustrating the ejector at the limit of its cap scavenging stroke before the detent has been tripped by the abutment on the barrel portion of the revolver.

The spring 17 is, therefore, normally compressed to the desired degree but becomes further compressed upon tilting of the barrel A on pivot 1, as shown in dotted lines in Fig. 1 and in full lines in Fig. 2, to provide an augmented source of energy. This energy when released is of sufficient magnitude to return the ejector to full line position of Figs. 1 and 3 after said ejector has completed its scavenging stroke (Fig. 2) to remove the simulated shells D and scavenge the debris of spent caps of the seats 10. This phase of the operation will become apparent from the following description.

When the cylinder C and ejector E are in the telescoped registering relation shown in full ilnes in Fig. 1, the tip $16^a$ of the shaft portion 16 engages with an offset finger 21 carried by the cam F which, as previously indicated, is mounted to turn on the pin 1. The cam F, at a point substantially diametrically opposite the finger 21, is provided with a recess 22 which provides a shoulder 23 adapted to be engaged by the head 24 of the detent G slidably mounted in the guide 25 in the stock portion B. While 23 and 24 are engaged, tilting movement of the barrel to "unload," will cause the ejector to move outwardly in the cylinder. The guide 25 contains a spring 26 which normally urges the detent G outward so that its head 24 is in continuous engagement with shoulder 23 until approximately the end of the ejecting and scavenging stroke of the ejector, as for example shown in Figs. 1 and 2, wherein the solid abutment H on the barrel portion approaches and eventually engages (Fig. 3) the exposed end of the detent G to move it rearwardly. As the barrel portion continues to be tilted, to the limit of its scavenging stroke, the head 24 of the detent is moved rearwardly and out of engagement with the shoulder 23. When this occurs the force of the spring 17 will return the ejector to the loading position shown in Fig. 2.

Figure 3:
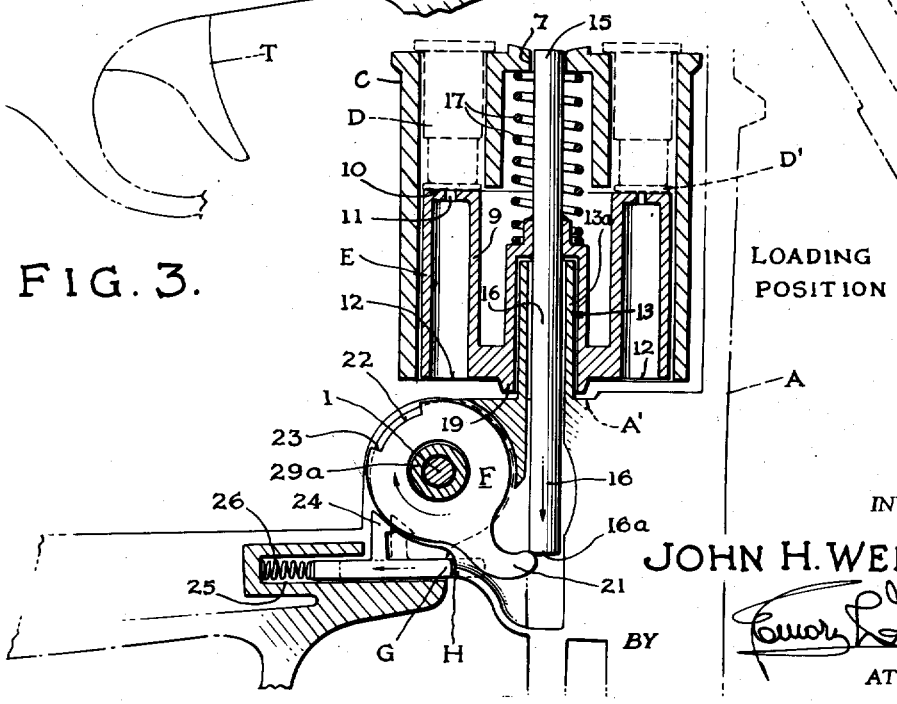
Fig. 3 is an enlarged more or less diagrammatic sectional view showing the relative positions of parts when the barrel is tilted to the limit of its position in relation to the stock, to move the detent to release the cam, the ejector being shown in fully retracted position, thus preparing the cylinder for reloading.
Figure 4:
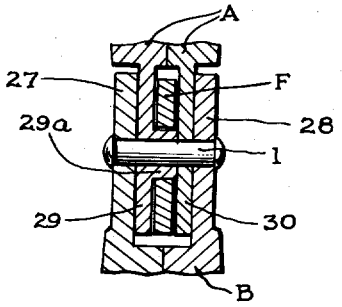
Fig. 4 is a detail sectional view on the line 4—4 of Fig. 1.

In connection with the cam F it will be seen from Fig. 4 that the stock portion B is provided with the outer bifurcated arm portions 27 and 28 in which the outer ends of the pivot pin 1 are mounted. As will also be seen from Fig. 4, the mating sections of the barrel portion A are provided with spaced bifurcated portions 29 and 30, the former having a boss $29^a$ upon which the cam F is freely mounted to readily yield to and be actuated by the spring energized shaft 15—16 whose end $16^a$ always engages the outer end of cam finger 21. The pivot pin 1 passes through the outer bifurcated portions 27 and 28 and the inner bifurcated portions 29 and 30 as well as the spacing stud $29^a$, and has its ends peened over to secure the barrel portion and stock together at the pin 1. When the end $16^a$ of shaft portion 16 is moved by spring 17 it will return cam F clockwise as the detent G is pushed out of engagement with shoulder 23 of the cam, as shown in Fig. 3.

The cycle of operations may be described as follows:

Assuming that the telescoped and interlocked cylinder C and ejector E are in the full line position shown in Fig. 1, the tip $16^a$ of the shaft 16 of the ejector will engage the arm 21. The telescoped and interlocked relationship of the cylinder C and ejector E is due to the internal ribs $C^2$ of the cylinder slidably engaging with the grooves $E^2$ in the side wall $E^1$ of the ejector, as will be apparent from Figure 5. The chambers 8 of the cylinder having the simulated shells D therein and percussion caps placed on the cap seats 10, the usual manipulation of the hammer by the trigger will cause the hammer to strike the simulated shells and detonate the caps D′, one after the other, since the cylinder and the ejector are turned by standard type ratchet mechanism.

When a round of shells has been "fired" and it is desired to reload the drum comprising the cylinder C and ejector E, the latch 2 is lifted slightly to clear keeper surfaces $4^a$ to disconnect the barrel portion A from the keeper 4 on the stock, but, immediately upon the latch disengaging the stock, the shoulder 5 on said latch still retains the cylinder C and ejector E in axially interlocked relation. As the barrel portion A continues to tilt on the pin 1 it will be seen that the tip $16^a$ of the shaft 16 will bear on the finger 21, compressing spring 17, while the cam F is held by head 24 of the detent G engaging shoulder 23. The dotted line position in Fig. 1 illustrates the position where the anvil elements substantially reach the entrances of the chamber 8, and if desired, the user can remove the shells D with his fingers. However, in most instances the barrel portion A will be tilted as far as the construction permits so that, as shown in Fig. 3, when the abutment H engages with detent G the cam will be released and shaft 15—16 will be free to move with the ejector to cause the anvil elements of the ejector to be forced to substantially coplanar relation (Fig. 2) with the rear wall 6 of the cylinder thereby to not only completely eject the shells, but also remove any cap debris on the seats 10.

Immediately subsequent to the completion of the scavenging stroke of the ejector (Fig. 2), the abutment H moves the detent G and the compressed spring 17 will shift the ejector and also the cam F back to its original position. The user may then put the caps in the chambers 8 by simply dropping them in the cavities thereof until they rest on the seats 10 and the solid shells D can be replaced. Thereafter, the barrel portion A may be relocked with the stock by the spring latch 2 and the toy is ready for another round of firing caps.

I claim:

1. In a toy revolver, the combination, comprising, a stock, a barrel, [pivoted to the stock,] a drum unit mounted *between the barrel and the stock* [in the barrel] and including, a cylinder provided with shell receiving chambers and having a rear end wall provided with a plurality of shell receiving openings in communication with said shell receiving chambers, and an ejector slidable within and masked by the cylinder and having [elongated tubular] anvil elements slidably telescoping within the chambers of the cylinder to remove shells from said chambers.

2. In a toy revolver, the combination, comprising, a stock, a barrel, [pivotally mounted on the stock,] a drum unit rotatably mounted [in the barrel] *between the barrel and the stock* and including, a cylinder provided with shell receiving chambers and having a rear end wall provided with a plurality of shell receiving openings communicating with said shell receiving chambers, a plurality of longitudinal inwardly projecting ribs on the cylinder, and an ejector including a body having its side wall provided with grooves for receiving said ribs to be angularly interlocked with the cylinder and slidable within the same, and a plurality of [elongated tubular] anvil elements [projecting from the rear end of the ejector body and slidably telescoping] within the chambers of the cylinder to remove shells from said chambers and to normally set the rear ends of the anvil elements relative to the cylinder to define the depth of said shell receiving chambers.

3. In a toy revolver, the combination, comprising, a stock, a barrel pivotally supported on the stock for tilting movement, a drum unit mounted in the barrel and including, a cylinder having a body provided with shell receiving chambers and having a rear end wall formed with an annular series of openings communicating with said shell receiving chambers, said cylinder also including side wall, an ejector having a body telescopically slidable within the said side wall of the cylinder, means for holding the cylinder and ejector slidably interlocked against angular movement, said ejector body having a plurality of elongated tubular anvil elements aligned with said openings for telescopic sliding movement into and out of the cylinder, and cap seating faces on the ends of said anvil elements and disposed within said chambers.

4. In a toy revolver, the combination, comprising, a stock, a barrel pivotally mounted on the stock for tilting movement, a drum unit rotatably mounted in the rear portion of the barrel and including, a cylinder having a body provided with a rear end wall and a side wall, said rear end wall formed with an axial opening and a plurality of openings disposed around said axial opening and communicating with shell receiving chambers, an ejector body slidable within and concealed by the side wall of the cylinder, a plurality of elongated tubular anvil elements on the body of less length than the over-all length of the cylinder and having end portions defining the normal inner limits of said shell receiving chambers, said elements telescopically slidable in the chambers, an axial shaft fixed to the ejector and extending beyond the front and read ends thereof, a spring confined between the inner face of the rear wall of the cylinder and the rear portion of the body of the ejector, said spring normally maintaining the anvil elements of the ejector removed from the shell receiving chambers, and means for actuating said ejector upon tilting of the barrel to move the rear end of said shaft against the force of said spring through said axial opening of the rear wall of the cylinder and also cause the anvil elements to simultaneously move through the cylinders of the chamber.

5. In a toy revolver, the combination, comprising, a stock, a barrel pivotally mounted on the stock for tilting movement toward and from a normal position relative to the stock, a sleeve on the barrel, a drum unit including a cylinder having a closed rear wall and a side wall, said rear end wall provided with an annular series of openings each in communication with a shell receiving chamber of the cylinder, an ejector having a plurality of elongated tubular anvil elements and rotatably supported on the sleeve and also rotatable with and slidably supporting said cylinder, a spring tending to force the ejector away from said rear end wall, and means for actuating said ejector upon the tilting of the barrel on its pivot to move said anvil elements of the ejector from a retracted loading position to a projected ejecting position, said ejector then retractable by the release of the force of said spring to restore the same to normal loading position.

References Cited in the file of this patent or the original patent

UNITED STATES PATENTS

| | | |
|---|---|---|
| 116,422 | Forehand et al. | June 27, 1871 |
| 179,084 | White | June 20, 1876 |
| 239,634 | Allen | Apr. 5, 1881 |
| 367,820 | Marlin | Aug. 9, 1887 |
| 370,926 | Caldwell | Oct. 4, 1887 |
| 425,979 | Caldwell | Apr. 22, 1890 |
| 612,071 | Wareham | Oct. 11, 1898 |
| 702,735 | Kolb et al. | June 17, 1902 |
| 884,119 | Zaiser | Apr. 7, 1908 |
| 1,181,417 | Wesson | May 2, 1916 |
| 2,087,193 | Jones | July 13, 1937 |
| 2,088,891 | Brubaker | Aug. 3, 1937 |
| 2,148,603 | Brubaker | Feb. 28, 1939 |
| 2,624,970 | Rowe | Jan. 13, 1953 |
| 2,655,755 | Nichols | Oct. 20, 1953 |
| 2,798,329 | Radatz | July 9, 1957 |
| 2,830,398 | Donohue | Apr. 15, 1958 |